(12) United States Patent
Bath et al.

(10) Patent No.: US 7,210,556 B2
(45) Date of Patent: May 1, 2007

(54) METHOD AND APPARATUS FOR INSTALLING A SENSOR ARRAY

(75) Inventors: William R. Bath, Cypress, TX (US); Frank Sayle, Sealy, TX (US)

(73) Assignee: Saipem America Inc., Houston, TX (US)

( * ) Notice: Subject to any disclaimer, the term of this patent is extended or adjusted under 35 U.S.C. 154(b) by 192 days.

(21) Appl. No.: 10/842,815

(22) Filed: May 11, 2004

(65) Prior Publication Data
US 2005/0155814 A1  Jul. 21, 2005

Related U.S. Application Data

(60) Provisional application No. 60/536,680, filed on Jan. 15, 2004.

(51) Int. Cl.
*G01V 1/09* (2006.01)
*B63C 11/52* (2006.01)

(52) U.S. Cl. .................... 181/112; 181/104; 181/118; 405/190; 405/191; 367/133; 367/153

(58) Field of Classification Search ............... 181/106, 181/110, 111, 114, 108, 118, 119, 120, 112; 318/568.77, 568.12, 568.21; 901/8, 31; 367/153; 414/22.66; 312/9.31; 405/190, 191
See application file for complete search history.

(56) References Cited

U.S. PATENT DOCUMENTS

| | | | | |
|---|---|---|---|---|
| 4,398,276 A | * | 8/1983 | Kruppenbach | 367/191 |
| 4,516,227 A | * | 5/1985 | Wener et al. | 367/15 |
| 5,253,223 A | * | 10/1993 | Svenning et al. | 367/178 |
| 5,271,953 A | * | 12/1993 | Litteral | 427/8 |
| 5,442,590 A | * | 8/1995 | Svenning et al. | 367/15 |
| 5,811,055 A | * | 9/1998 | Geiger | 266/49 |
| 6,474,254 B1 | * | 11/2002 | Ambs et al. | 114/312 |
| 6,612,397 B2 | * | 9/2003 | Sparrevik et al. | 181/120 |
| 6,625,083 B2 | * | 9/2003 | Vandenbroucke | 367/15 |
| 6,657,921 B1 | * | 12/2003 | Ambs | 367/20 |
| 6,975,560 B2 | * | 12/2005 | Berg et al. | 367/16 |

(Continued)

OTHER PUBLICATIONS

"Reservoir of hope," Offshore Engineer, Dec. 2003, pp. 12-15.

(Continued)

*Primary Examiner*—Lincoln Donovan
*Assistant Examiner*—Jeremy Luks
(74) *Attorney, Agent, or Firm*—Howrey LLP

(57) ABSTRACT

An apparatus and method is provided for transporting, installing, retrieving, and replacing a sensor array of individual sensor pods at a geographically remote location, such as on the sea floor. The apparatus consists of a remotely operated vehicle (ROV), a carousel attached to the ROV, a pod ejector mechanism attached to the carousel, and a manipulator with a manipulator end effector attached to the ROV. The carousel contains a plurality of sensor pod holders, where each sensor pod holder is capable of holding a sensor pod. The pod ejector mechanism is capable of discharging a fresh sensor pod, while the manipulator end effector is capable of lifting a depleted sensor pod and placing the depleted sensor pod in an empty sensor pod holder in the carousel.

37 Claims, 3 Drawing Sheets

U.S. PATENT DOCUMENTS

2001/0028041 A1* 10/2001 Hubbard .................. 250/492.1
2005/0276665 A1* 12/2005 Entralgo et al. ............ 405/190
2006/0120216 A1*  6/2006 Ray et al. ..................... 367/15
2006/0159524 A1*  7/2006 Thompson et al. ......... 405/190

OTHER PUBLICATIONS (Form PCT/ISA/220) PCT Notification of Transmittal of the International Search Report & the Written Opinion of the International Searching Authority, or the Declaration Mailed Feb. 22, 2006, for PCT/US2004/016297, Filed May 24, 2004.

* cited by examiner

METHOD AND APPARATUS FOR INSTALLING A SENSOR ARRAY

PRIORITY CLAIM

This application claims priority to U.S. Provisional Patent Application Ser. No. 60/536,680, filed Jan. 15, 2004, which is incorporated herein by reference.

BACKGROUND OF THE INVENTION

The present invention relates generally to a method and apparatus for installing and servicing an array of individual sensor pods used, for example, for seismic measurement of a hydrocarbon field.

The value of seismic surveying to the exploration and discovery of oil and gas formations is well known in the petroleum industry. Developments in computing power have enabled the further development and use of seismic surveying including three dimensional (3-D) seismic surveys. In many cases, the processing of the measured seismic data can be a critical factor in the value of a seismic survey. The final interpretation of a seismic image is only as good as the quality of the seismic data.

Today, 3-D subsea seismic exploration is typically accomplished with a seismic survey ship equipped with an energy source and a plurality of receivers attached to one or more streamers that are towed behind the ship at a very precise speed. The energy source is designed to produce compressional waves that propagate through the water and into the underwater land formation. As the compressional waves propagate through the land formation, they strike interfaces between the formations, commonly referred to as strata, and reflect back through the earth and water to the receiver. The receivers typically function to convert the reflected waves into electrical signals that are then processed into an image that provides information about the structure of the subterranean formation.

It has been discovered that a subsea array of individual sensor pods resting on the sea floor more accurately measures the 3-D seismic data obtained for a hydrocarbon field. To form such an array, individual sensor pods must typically be located in a grid on the sea floor at precise locations, typically about 200–500 meters apart. Sensor pod locations may be measured with a long base line acoustic array and transponders. Each sensor pod contains a data collection computer and an internal battery. After the array is in place, a surface ship is used to provide the acoustic source and the sensor pods record the subsequent reflections. At regular intervals the sensor pods must be retrieved and replaced with fresh pods. On the surface, the data stored in each recovered sensor pod must be downloaded and the battery recharged before it can be reused. Installing and replacing the sensor pod array is a significant part of the seismic survey because the survey cannot start or resume until all sensor pods are in place. In water depths of 3,000 meters, for example, travel time between the surface and the sea floor is significant, so an efficient method for placing and retrieving sensor pods is critical to an economically successful subsea seismic survey.

What is needed is a method and apparatus for transporting, installing, and retrieving a sensor array of individual sensor pods at a geographically remote location, such as on the sea floor.

SUMMARY OF THE INVENTION

An apparatus for transporting, installing, and retrieving a deepwater subsea sensor array of individual sensor pods is provided. The apparatus consists of a remotely operated vehicle (ROV), a carousel attached to the ROV, a pod ejector mechanism attached to the carousel, and a manipulator with a manipulator end effector attached to the ROV. The carousel contains a plurality sensor pod holders, where each sensor pod holder is capable of holding a sensor pod. The pod ejector mechanism is capable of discharging a fresh sensor pod, while the manipulator end effector is capable of lifting a depleted sensor pod from the sea floor and placing the depleted sensor pod in an empty pod holder in the carousel.

A method for installing a sensor array at a geographically remote location, such as on the sea floor, is also provided. An ROV with a carousel containing a plurality of fresh sensor pods distributes the sensor pods individually on the sea floor at preassigned positions. The ROV reloads with a new carousel of fresh sensor pods at the surface or subsea as required until the subsea sensor array is complete.

A method for recovering a plurality of depleted sensor pods from a geographically remote location, such as on the sea floor, is also provided. An ROV with an empty carousel is positioned proximate to a depleted sensor pod at the sea floor. The depleted sensor pod is lifted using a manipulator end effector, then stored in an empty pod holder on the carousel. The ROV unloads the full carousel of depleted sensor pods at the surface or subsea as required until the depleted sensor pods have all been recovered.

A method for replacing a plurality of depleted sensor pods from a geographically remote location, such as on the sea floor, with a plurality of fresh sensor pods is also provided. An ROV with a carousel containing a plurality of fresh sensor pods is deployed and positioned proximate to a depleted sensor pod. The depleted sensor pod is lifted using a manipulator end effector. A fresh sensor pod is either placed in the depleted sensor pod's location after the depleted sensor pod is removed or proximate to the depleted sensor pod's location if placed prior to lifting the depleted sensor pod. The manipulator then places the recovered depleted sensor pod in the pod holder on the carousel previously occupied by the fresh sensor pod. At the surface, the ROV unloads the full carousel of depleted sensor pods and reloads with a carousel of fresh sensor pods as needed until the depleted sensor pods have all been replaced.

BRIEF DESCRIPTION OF THE DRAWINGS

A more complete understanding of the present invention may be obtained with reference to the accompanying drawings.

DESCRIPTION OF ILLUSTRATIVE EMBODIMENTS

Figure 1:
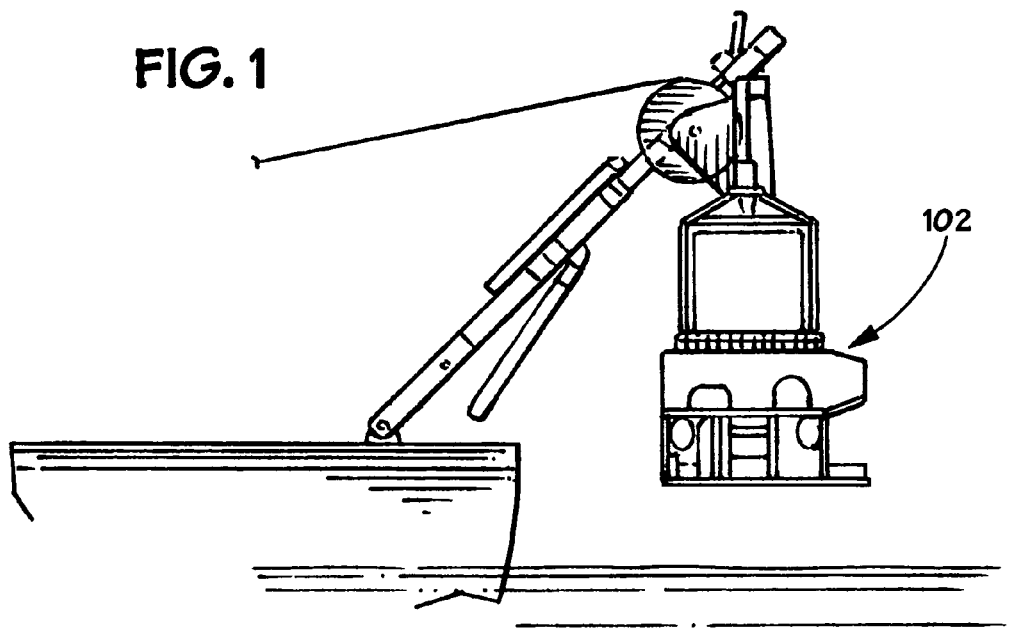
FIG. 1 shows a prior art ROV deployment system.

In a preferred method of the present invention, a remotely operated vehicle (ROV), such as, for example, the INNOVATOR® manufactured by Sonsub Inc. of Houston, Tex., is deployed from a surface vessel to install a sensor array in a geographically remote location, such as on the sea floor. The ROV carries a plurality of sensor pods which are distributed individually on the sea floor at preassigned positions according to seismic testing plan. A subsea sensor pod as described herein generally consists of a seismic receiver encased in a shell sufficient to allow the receiver to receive seismic signals and protect the receiver in a subsea environment. The sensor pod shell is preferably constructed of plastic or metal, and can take any shape, size, and form. Preferably a subsea sensor pod as used in conjunction with an ROV is circular in cross-sectional shape so as to facilitate easy loading/unloading from an ROV as disclosed herein. Because a subsea sensor array may consist of several hundred or even several thousand sensors, and because an ROV is practically limited in the maximum number of sensors that it can effectively carry and distribute, the ROV must "reload" with additional sensor pods. This reloading step can occur with a return trip to the surface (i.e. to a floating structure such as a boat) or, alternatively, the ROV can reload subsea using a docking/undocking arrangement. This procedure of distributing and reloading is repeated until the subsea sensor array is complete.

In another preferred method of the present invention, an ROV is deployed to recover depleted sensor pods from a geographically remote location, such as on the sea floor. Sensor pods will typically become depleted through consumption of its available memory space and/or through discharge of its battery. Once retrieved, the data stored in each recovered sensor pod can be downloaded and the battery recharged such that each sensor pod can be reused. Recovering the depleted sensor pod consists of positioning the ROV proximate to the depleted sensor pod, then recovering the depleted sensor pod from the sea floor. A plurality of discharged sensor pods are preferably stored on the ROV so as to efficiently effectuate the removal of a maximum number of depleted sensor pods for each trip to the sea floor.

In yet another preferred method of the present invention, an ROV is deployed to replace depleted (i.e. drained or partially drained battery and/or limited available memory) sensor pods from a geographically remote location, such as on the sea floor, with fresh (i.e. recharged or partially recharged battery and/or available memory) sensor pods. The ROV carries a plurality of fresh sensor pods to be distributed in the place of existing depleted sensor pods. Recovering a depleted sensor pod consists of positioning the ROV proximate to the depleted sensor pod, then recovering the depleted sensor pod from the sea floor, then placing a fresh sensor pod in the discharged sensor pod's location. Alternatively, the fresh sensor pod may be placed next to the depleted sensor pod prior to the depleted sensor pod's recovery. Because several hundred or even several thousand depleted sensors in an array may need to be replaced, and because an ROV is practically limited in the number of sensors that it can carry on each trip, the ROV must be equipped with efficient storage for both fresh sensor pods and depleted sensor pods. In an exemplary embodiment of the present invention, each recovered depleted sensor pod is stored in a location on the ROV previously occupied by the fresh sensor pod that replaced it. Once all fresh sensor pods have been distributed, the ROV must make a return trip to the surface (i.e. to a floating structure), or otherwise dock/undock subsea as described above, to offload the recovered depleted sensor pods and to reload with additional fresh sensor pods. This procedure of recovering depleted pods, distributing fresh pods, and offloading/reloading is repeated until all depleted sensor pods have been replaced.

A preferred apparatus for carrying out these methods will now be described with reference to the accompanying drawings. This invention may, however, be embodied in many different forms and should not be construed as being limited to the embodiments set forth herein.

Figure 3:
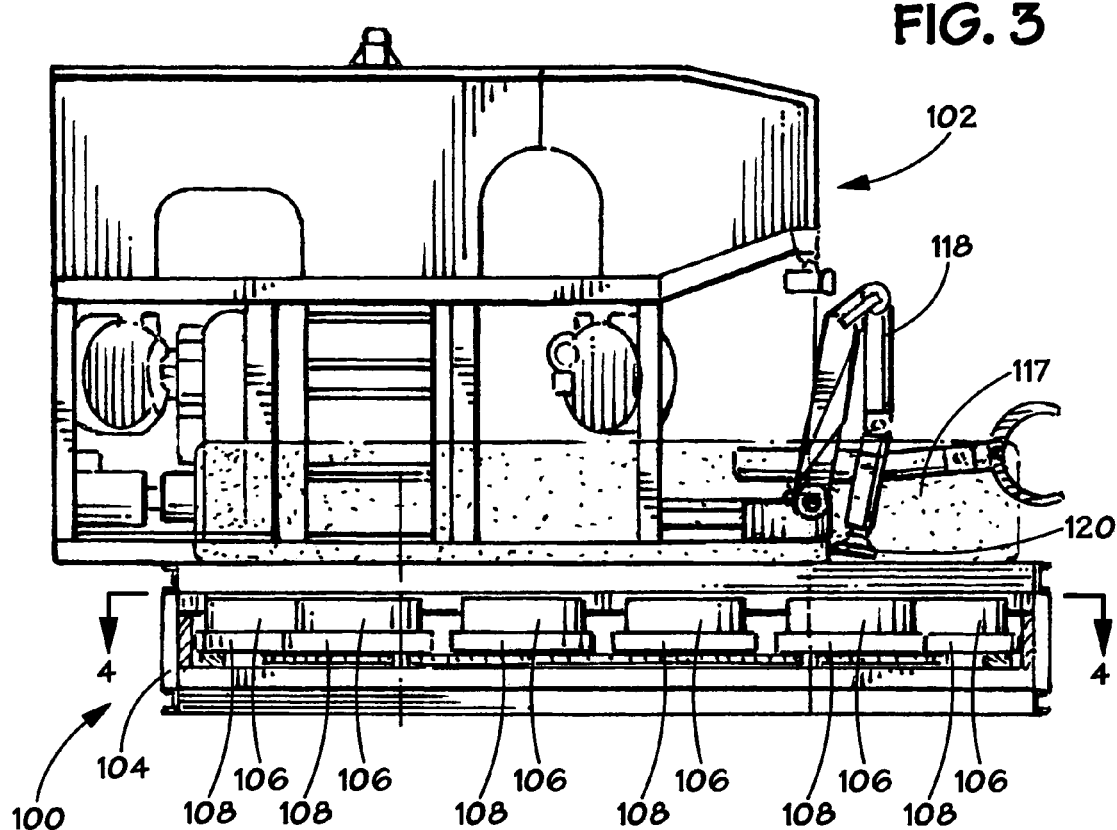
FIG. 3 shows a side view of a carousel of the present invention connected to an ROV.
Figure 4:
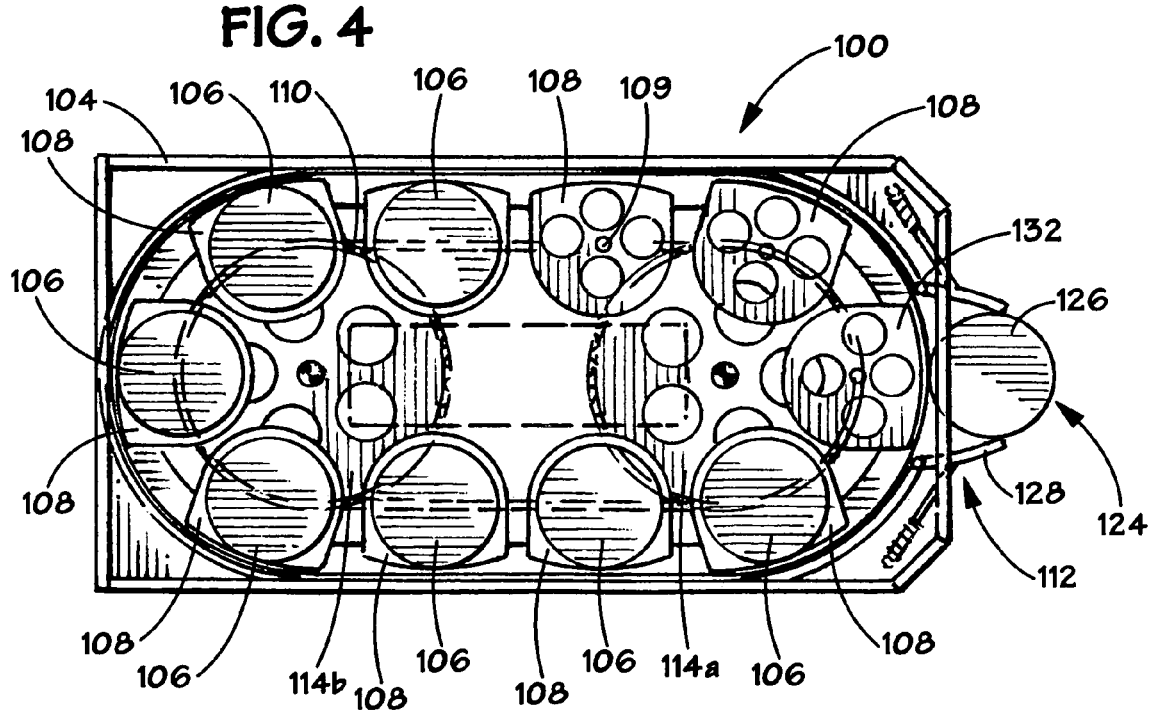
FIG. 4 shows a top view of a carousel of the present invention.

Referring to FIGS. 3 and 4, a carousel 100 is mounted to the bottom of ROV 102. Carousel 100 is comprised of a frame 104, preferably an aluminum weldment fabricated from plate and standard structural shapes, which carries a plurality of sensor pods 106 in a chain of pod holders 108. Each pod holder 108 carries one sensor pod 106. The top side of carousel 100 is open to facilitate the loading and unloading of sensor pods 106.

The carousel frame 104 provides a rigid support for ROV 102 during carousel change out operations on the surface. Pod holders 108 are supported on a substantially flat track 110 (see FIG. 4) that allows each pod holder to be transported to the front 112 of the carousel in-turn using a chain drive. Sprockets 114a and 114b at either end of the carousel 100 facilitate this transport operation, and are supported by axles attached to flat track 110. A carousel drive mechanism (not shown) is also incorporated into ROV 102 for operating the chain drive in carousel 100. The sprocket 114a at the front of the carousel is generally suitable for connection to the carousel drive mechanism, although both sprockets may alternatively be so connected. The drive mechanism is hydraulically powered from the ROV 102 and is easily disconnected and reconnected to carousel 100 during carousel change out.

In the exemplary embodiment illustrated in FIG. 4, ten pod holders 108 are installed in carousel frame 104. Each pod holder 108 provides a clear space, typically at least 27" diameter, for holding a sensor pod 106. Each pod holder 108 preferably provides a 4" high backstop around approximately 245°, with the remaining circumference left open to allow ejection of the sensor pod 126. Each pod holder 108 has a center hub 109 that interfaces with sprockets 114a and 114b. The ten pod holders 108 are preferably connected by ¾" pitch, stainless steel roller chain to form a continuous chain of pod holders. Each pod holder 108 and each sprocket 114 is preferably fitted with Ultra High Molecular Weight (UHMW) Polyethylene bearing pads (not shown) that align with the support track 110.

Figure 2:
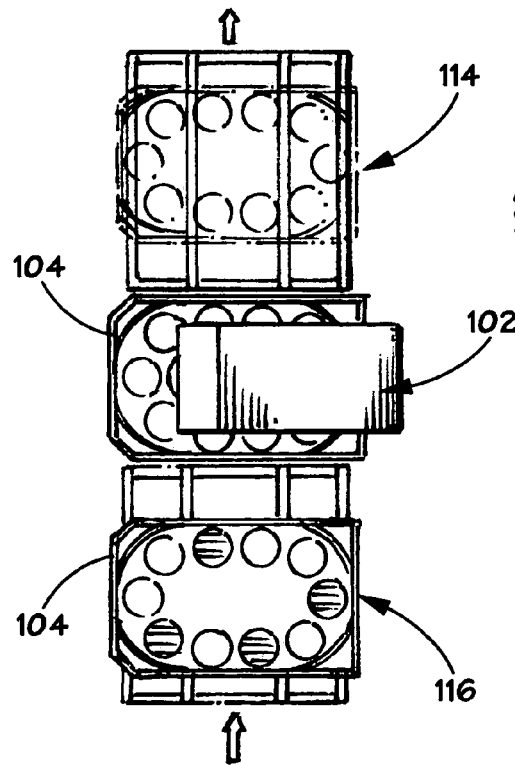
FIG. 2 illustrates the unloading and reloading of a carousel in accordance with certain teachings of the present invention.

Each carousel frame 104 is designed to slide into position from either side of ROV 102 as is illustrated in FIG. 2. As shown in FIG. 2, this preferred design facilitates carousel change out operations, such as, for example, the offloading of depleted sensor pods (depleted carousel 114) from one side of the ROV 102 and the reloading of fresh sensor pods (fresh carousel 116) from the other side of ROV 102. Alternatively (not shown), depleted carousel 114 and fresh carousel 116 may be designed to be offloaded/reloaded from the same side of ROV 102. Alternatively (not shown), carousel change out can be accomplished by lifting ROV 102 off of depleted carousel 114 and lowering ROV 102 onto fresh carousel 116.

A minimum of four simple manual latches (not shown) are provided for locking the carousel frame 104 to ROV 102 during subsea operations. Alternatively, carousel 100 may be designed to slide and latch within a separate frame attached to ROV 102, such as a deployment frame (not shown). Other means for locking carousel frame 104 to ROV 102 are envisioned, although it is preferred that such locking means provide for easy carousel change-out as described above. Two carousels are preferably provided for each ROV so that one carousel can be unloaded and reloaded while the other carousel is deployed with the ROV.

Additionally, two buoyancy modules (117 in FIG. 3), suitable for subsea use and preferably down to at least 3,000 meter water depth, are preferably incorporated into each carousel frame 104. The buoyancy module 117 is attached, such as with bolts or other suitable latching means, on the carousel frame 104 such that it can be easily removed for disassembly of the carousel 100.

As illustrated in FIG. 3, a manipulator assembly 118 having an articulated arm, one end of the articulated arm being connected to said manipulator assembly and the opposite end having an end effector 120 that is preferably a hydraulic suction cup ("sticky foot"). The sticky foot 120 allows the manipulator 118 to easily grab and lift a depleted sensor pod from the sea floor, such as during the recovery operations described above. The sticky foot 120 is powered by a seawater pump (not shown) mounted on the ROV 102 and preferably provides an attachment suction force of at least 150 lbs when attached underwater to the smooth top surface of a sensor pod. This method of grabbing the sensor pods eliminates the need for a ROV-friendly handle that would interfere with the carousel handling system. Manipulator assembly 118 may be located on the front of ROV 102 as shown in FIG. 3, but it is envisioned that manipulator 118 can be remounted on the front of a deployment frame (if used) to increase the available reach for reaching a sensor pod 106 on the sea floor.

As shown in FIG. 4, carousel 100 also preferably incorporates a pod-ejection system 124 that allows one sensor pod at a time ("ejection pod 126") to be hydraulically ejected from the front 112 of carousel 100. This pod ejection system 124 allows faster initial placement of the sensor pods 106 as well and reduces manipulator handling when replacing pods—the manipulator 118 is only needed to lift the depleted sensor pods from the sea floor without placing its replacement. Each carousel frame 104 includes a guide rail 128 to prevent premature ejection of ejection pod 126. The guide rail 128 preferably contains a spring-loaded gate to allow ejection of the ejection pod 126 at the front 112 of carousel 100. Alternatively, instead of using a pod ejection system 124, the sensor pod located in pod holder 132 may be removed and placed from carousel 100 by using manipulator assembly 118. As such, manipulator 118 and sticky foot 120 can easily grab and lift the sensor pod from pod holder 132.

Figure 5:
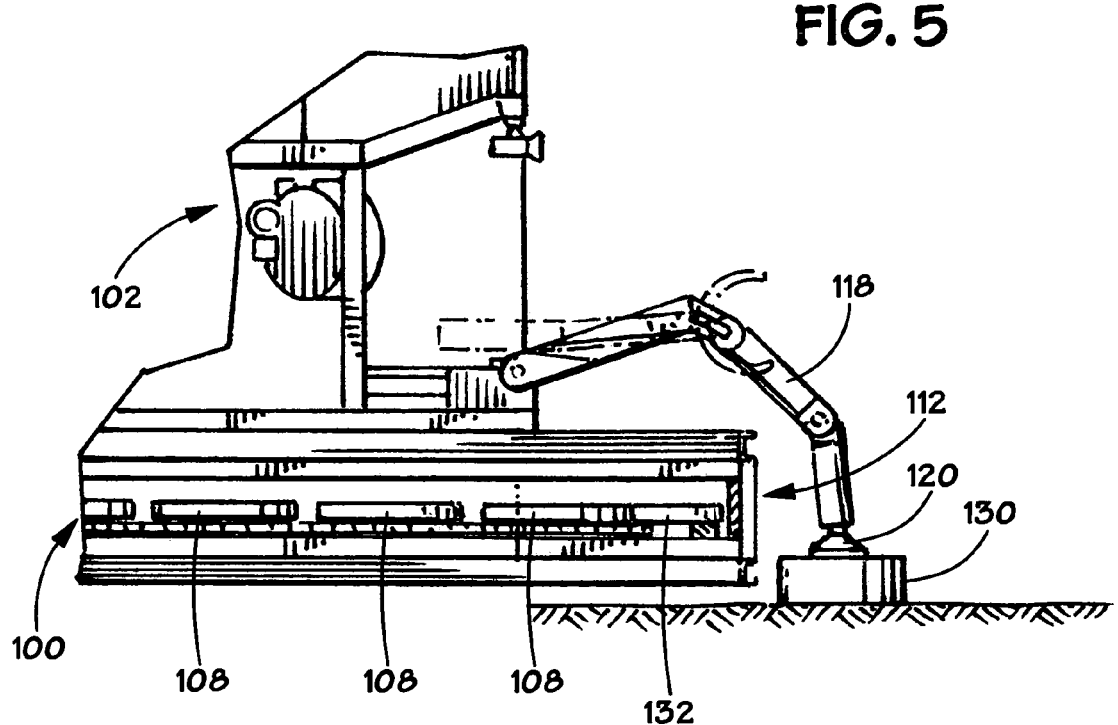
FIG. 5 illustrates a method for lifting a depleted sensor pod from the sea floor in accordance with certain teachings of the present invention.
Figure 6:
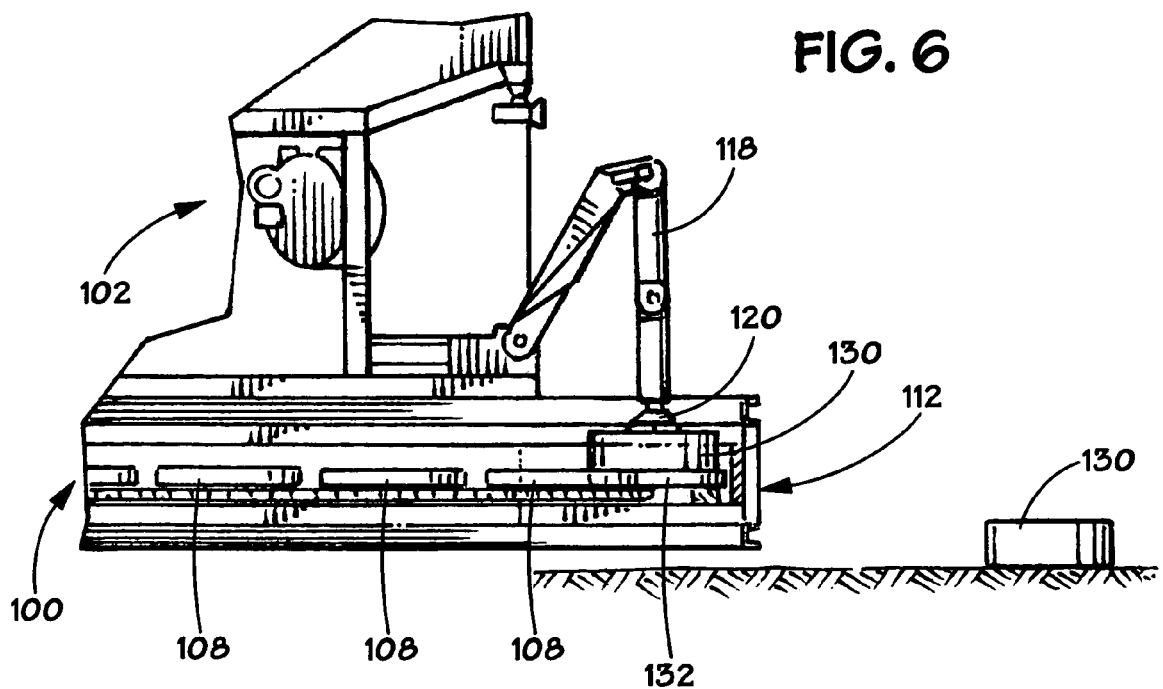
FIG. 6 illustrates a method for storing a depleted sensor pod on an ROV in accordance with certain teachings of the present invention.

Referring to FIGS. 5 and 6, a preferred method for recovering a depleted sensor pod is illustrated. ROV 102 with carousel 100 are deployed as described above with an empty carousel to the sea floor to recover a maximum of ten depleted sensor pods 130 (i.e. the number of empty pod holders 108 on carousel 100). As shown in FIG. 5, manipulator 118, and sticky foot 120 are used to lift a depleted sensor pod 130 from the sea floor. The manipulator 118 then positions the depleted sensor pod 130 in the empty pod holder corresponding to the front 112 of the carousel 100. Sticky foot 122 then releases the depleted sensor pod 130 and the carousel can then be turned to provide a new empty pod holder at the front of the carousel for the next depleted sensor pod to be recovered. This process is continued until all ten pod holders 108 have been filled with depleted sensor pods 130, at which time the ROV 102 must return to the surface to unload the full carousel.

The preferred method for replacing depleted sensor pods is similar. This time, carousel 100 is deployed as described above with up to ten fresh sensor pods 106. The sticky foot 120 recovers a depleted sensor pod 130 as described above with respect to FIGS. 5 and 6. As best shown in FIG. 4, the pod holder 132 in the front 112 of carousel 100 is empty because fresh sensor pod 126 has been ejected through the pod ejection system 124. In this manner, fresh sensor pod 126 replaces depleted sensor pod 130 in a near simultaneous manner, thereby opening up a storage location for depleted sensor pod 130 in pod holder 132. Alternatively, the fresh sensor pod may be placed next to depleted sensor pod 130 on the sea floor using sticky foot 120 prior to recovering depleted sensor pod 130. The carousel then is turned in order to provide another fresh sensor pod for the pod holder 132 in the front 112 of carousel 100. This process is continued until all ten depleted sensor pods have been replaced with fresh sensor pods (the depleted sensor pods occupying pod holders 108), at which time the ROV must return to the surface to unload the carousel.

It will be apparent to one of skill in the art that described herein is a novel method and apparatus for transporting, installing, and retrieving a sensor array of individual sensor pods at a geographically remote location, such as on the sea floor. While the invention has been described with references to specific preferred and exemplary embodiments, including specific application to subsea sensor arrays on the sea floor, it is not limited to these embodiments. Although the invention herein is described in reference to seismic surveys at subsea locations, it should be understood that the method and apparatus of this invention are likewise acceptable to other geographically remote locations. The invention may be modified or varied in many ways and such modifications and variations as would be obvious to one of skill in the art are within the scope and spirit of the invention and are included within the scope of the following claims.

What is claimed is:

1. A method for installing a sensor array in a geographically remote location, comprising:
    (a) deploying a remotely operated vehicle from a base location, the remotely operated vehicle carrying a first plurality of sensor pods, wherein the first plurality of sensor pods is carried in a carousel;
    (b) individually placing a desired number of sensor pods of the plurality of sensor pods in the remote location in a preassigned position;
    (c) reloading the remotely operated vehicle with a second plurality of sensor pods; and
    (d) repeating steps (a)–(c) as needed until the desired deployment of the subsea sensor array is complete.

2. The method of claim 1, wherein the reloading step comprises returning the remotely operated vehicle to the base location after one or more of the first plurality of sensor pods is placed.

3. The method of claim 1, wherein the geographically remote location is the sea floor.

4. The method of claim 2, wherein the sensor array is a subsea sensor array.

5. The method of claim 3, wherein the base location is a floating structure.

6. A method for installing a subsea sensor array on the sea floor, comprising:
    (a) deploying a remotely operated vehicle carrying a first plurality of sensor pods, wherein the first plurality of sensor pods is carried in a carousel;
    (b) individually placing each sensor pod on the sea floor in a preassigned position;

(c) reloading the remotely operated vehicle with a second plurality of sensor pods; and (d) repeating steps (a)–(c) as needed until the subsea sensor array is complete.

7. The method of claim 6, wherein the reloading step comprises returning the remotely operated vehicle to the surface after the first plurality of sensor pods is placed.

8. The method of claim 6, wherein the reloading step comprises replacing the first carousel with a second carousel carrying the second plurality of sensor pods.

9. The method of claim 6, wherein the placing step is executed by ejecting a sensor pod from the carousel.

10. A method for recovering an individual depleted sensor pod from a geographically remote location, comprising:

(a) deploying a remotely operated vehicle;

(b) positioning the remotely operated vehicle proximate to the depleted sensor pod; and (c) recovering the depleted sensor pod from the geographically remote location, wherein the depleted sensor pod is carried in a carousel on the remotely operated vehicle.

11. The method of claim 10, wherein the geographically remote location is the sea floor.

12. The method of claim 10, wherein the recovering step further comprises lifting the discharged sensor pod using a manipulator end effector.

13. A method for replacing a depleted sensor pod in a sensor array located in a geographically remote location, comprising:

(a) deploying a remotely operated vehicle from a base location, wherein a plurality of fresh sensor pods is carried in a carousel on the remotely operated vehicle;

(b) positioning the remotely operated vehicle proximate to a depleted sensor pod;

(c) recovering the depleted sensor pod from its position; and (d) individually placing one of the plurality of fresh sensor pods in substantially the same position previously occupied by the depleted sensor pod.

14. The method of claim 13, wherein the geographically remote location is on the sea floor.

15. The method of claim 14, wherein the sensor array is a subsea sensor array.

16. The method of claim 14, wherein the base location is a floating structure.

17. The method of claim 13, wherein step (d) occurs before step (c), and wherein the fresh sensor pod is placed substantially near the depleted sensor pod's position.

18. The method of claim 13, further comprising:

(e) repeating steps (a)–(d) until a plurality of depleted sensor pods has been replaced by the plurality of fresh sensor pods.

19. The method of claim 18, further comprising:

(f) reloading the remotely operated vehicle with a second plurality of fresh sensor pods; and (g) repeating steps (a)–(f) as needed until all depleted sensor pods are replaced.

20. The method of claim 19, wherein the reloading step comprises returning the remotely operated vehicle to the base location after the plurality of depleted sensor pods has been replaced.

21. The method of claim 13, wherein the placing step is executed by ejecting a fresh sensor pod from the carousel.

22. The method of claim 13, wherein the placing step is executed by lifting the fresh sensor pod from the carousel using a manipulator end effector system.

23. The method of claim 13, wherein the recovering step further comprises lifting the depleted sensor pod using a manipulator end effector system.

24. The method of claim 13, wherein the placing step is executed using a manipulator end effector system.

25. The method of claim 18, wherein each recovered depleted sensor pod is stored on the remotely operated vehicle.

26. The method of claim 13, wherein each recovered depleted sensor pod is stored in the carousel.

27. The method of claim 21, wherein each recovered depleted sensor pod is stored in the place in the carousel previously occupied by a fresh sensor pod.

28. The method of claim 22, wherein each recovered depleted sensor pod is stored in the place in the carousel previously occupied by a fresh sensor pod.

29. An apparatus for installing and maintaining a sensor array, comprising:

a carousel comprising a plurality of sensor pod holders, wherein each sensor pod holder is capable of holding a sensor pod, and wherein the plurality of sensor pod holders are supported on a track that allows each sensor pod holder to be transported around the carousel; and a pod ejector mechanism attached to the carousel and capable of discharging an individual sensor pod from the carousel from a specific carousel position.

30. The apparatus of claim 29, further comprising at least one sprocket for transporting the sensor pod holders around the carousel.

31. The apparatus of claim 29, wherein the carousel is attached to a remotely operated vehicle.

32. The apparatus of claim 31, wherein the carousel is attached to the remotely operated vehicle using latches.

33. The apparatus of claim 31, wherein the carousel is attached to the remotely operated vehicle using a carousel frame.

34. The apparatus of claim 29, further comprising a manipulator end effector capable of lifting an individual sensor pod.

35. The apparatus of claim 34, wherein the manipulator end effector comprises a hydraulic suction cup.

36. The apparatus of claim 35, wherein the hydraulic suction cup is powered by a water pump.

37. The apparatus of claim 34, wherein the manipulator end effector is capable of lifting an individual sensor and dropping the individual sensor onto an empty sensor pod holder on the carousel.

* * * * *